United States Patent [19]

Miale et al.

[11] Patent Number: 4,538,016

[45] Date of Patent: Aug. 27, 1985

[54] CATALYSIS OVER ACTIVATED ZEOLITES

[75] Inventors: Joseph N. Miale, Lawrenceville; Clarence D. Chang, Princeton, both of N.J.

[73] Assignee: Mobil Oil Corporation, New York, N.Y.

[21] Appl. No.: 668,355

[22] Filed: Nov. 5, 1984

Related U.S. Application Data

[60] Division of Ser. No. 552,543, Nov. 16, 1983, Pat. No. 4,500,420, which is a continuation-in-part of Ser. No. 355,416, Mar. 8, 1982, Pat. No. 4,427,789.

[51] Int. Cl.$^3$ .................................................. C07C 1/20
[52] U.S. Cl. ................................... 585/408; 585/469; 585/640; 585/733
[58] Field of Search ................ 585/469, 640, 733, 408

[56] References Cited

U.S. PATENT DOCUMENTS

| | | | |
|---|---|---|---|
| 3,630,965 | 12/1971 | Voorhies, Jr. et al. | 502/79 |
| 3,933,983 | 1/1976 | Elliott, Jr. | 502/65 |
| 4,263,126 | 4/1981 | Rollmann | 208/14 |
| 4,305,808 | 12/1981 | Bowes et al. | 502/74 |
| 4,356,156 | 10/1982 | Dyer et al. | 502/60 |
| 4,359,595 | 11/1982 | Rollmann | 585/640 |
| 4,404,414 | 9/1983 | Penick et al. | 585/733 |

*Primary Examiner*—D. E. Gantz
*Assistant Examiner*—Cynthia A. Prezlock
*Attorney, Agent, or Firm*—Alexander J. McKillop; Michael G. Gilman; Dennis P. Santini

[57] ABSTRACT

A process is provided for conducting organic compound conversion over a catalyst comprising a zeolite composition prepared by a method which comprises compositing a specific zeolite material with alumina, impregnating the composite with an aqueous solution of an alkali metal fluoride under vacuum, contacting the impregnated composite with an ammonium salt solution and calcining the resulting material.

18 Claims, No Drawings

CATALYSIS OVER ACTIVATED ZEOLITES

CROSS-REFERENCE TO RELATED APPLICATIONS

This application is a division of application Ser. No. 552,543 filed Nov. 16, 1983, now U.S. Pat. No. 4,500,420, which is a continuation-in-part of application Ser. No. 355,416, filed Mar. 8, 1982, now U.S. Pat. No. 4,427,789.

BACKGROUND OF THE INVENTION

1. Field of the Invention

This invention relates to a process for conducting organic compound conversion over a catalyst comprising a crystalline aluminosilicate, including a high silica-containing crystalline material, which has been treated by the steps of combining and, preferably, extending same with a support matrix of alumina, vacuum impregnating the resulting composite, preferably extrudate, with an aqueous solution of an alkali metal fluoride, contacting the impregnated material with warm aqueous solution of an ammonium salt, and calcining the ammonium salt solution contacted material.

2. Description of Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejection those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alikaline earth metal cation. This can be expressed wherein the ratio of aluminum to the number of various cations, such as $Ca/2$, $Sr/2$, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated convenient symbols, as illustrated by zeolite ZSM-5 (U.S. Pat. No. 3,702,886).

High silica-containing zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describes microporous crystalline silicas or organo silicates wherein the aluminum content present is at impurity levels.

Because of the extremely low aluminum content of these high silica-containing zeolites, their ion exchange capacity is not as great as materials with a higher aluminum content. Therefor, when these materials are contacted with an acidic solution and thereafter are processed in a conventional manner, they are not as catalytically active as their higher aluminum-containing counterparts.

The method for treating crystalline materials for use herein as catalyst components permits the preparation of certain high silica-containing materials which have all the desirable properties inherently possessed by such high silica materials and, yet, have an acid activity, which heretofore has only been possible to be achieved by materials having a higher aluminum content in their "as synthesized" form. It further permits valuable activation of crystalline zeolites having much lower silica-to-alumina mole ratios.

It is noted that U.S. Pat. Nos. 3,354,078 and 3,644,220 relate to treating crystalline aluminosilicates with volatile metal halides. Neither of these latter patents is, however, concerned with treatment of crystalline materials having a high silica-to-alumina mole ratio or with treatment of any crystalline zeolite with alkali metal fluoride compounds in the present manner.

SUMMARY OF THE INVENTION

The present invention relates to a novel process for converting organic compounds over a catalyst comprising a zeolite composition having undergone a particular activation technique. The zeolite, including a high silica-containing crystalline zeolite, either "as synthesized" or initially ion-exchanged, is incorporated with a support matrix material of alumina, and, if desired, formed into an extrudate. The resulting composite is vacuum impregnated with an aqueous solution of an alkali metal fluoride (e.g. LiF, NaF, KF, RbF or CsF), contacted with a warm aqueous solution of an ammonium salt (e.g. $NH_4NO_3$), and then calcined. The resulting composite material exhibits enhanced Bronsted acidity and, therefore, improved acid activity toward catalysis of numerous chemical reactions, such as, for example, cracking of organic, e.g. hydrocarbon, compounds.

DESCRIPTION OF SPECIFIC EMBODIMENTS

This is a division of application Ser. No. 552,543, filed Nov. 16, 1983, which is a continuation-in-part of application Ser. No. 355,416, filed Mar. 8, 1982, now U.S. Pat. No. 4,427,789, incorporated herein by reference in its entirety.

The expression "high silica-containing crystalline material" is intended to define a crystalline structure which has an initial silica-to-alumina ratio greater than 100 and more preferably greater than 500, up to and including those highly siliceous materials where the silica-to-alumina ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides silica and/or aluminum associated therewith, such as boron, iron, chromium, etc. Thus, the starting materials utilized in the novel process of this invention may have an initial silica-to-alumina ratio greater than about 100 (irrespective of what other materials or metals are present in the crystal structure).

The zeolite starting materials utilized herein, including those having an initial silica-to-alumina mole ratio greater than about 100, may be prepared from reaction mixtures containing sources of various cations. The present process provides noted improvement regardless of which cation sources are present in said reaction mixtures. Non-limiting examples of cation sources to be used in the manufacture of the zeolite starting materials include amines, diamines, pyrrolidine, onium compounds and compounds containing multiple cationic centers. Examples of onium compounds are those having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

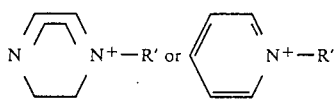

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

The compounds containing multiple cationic centers include those having the formula:

$$[(R)_3M^+(Z)_nM^+(R)_3](X^-)_2$$

wherein R, M and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

$[(CH_3)_3As^+(CH_2)_6N^+(CH_3)_3](Cl^-)_2$,
$[(C_3H_7)_3N^+(CH_2)_{10}N^+(C_3H_7)_3](Cl^-)_2$,
$[(C_6H_5)_3N^+(C_2H_4)_{16}P^+(C_6H_5)_3](OH^-)_2$,
$[(C_{18}H_{37})_3P^+(C_2H_2)_3P^+(CH_3)_3](Cl^-)_2$,
$[(C_2H_5)_3N^+(C_6H_4)N^+(C_2H_5)_3](Br^-)_2$,
$[(CH_3)_3Sb^+(CH_2)_{10}Sb^+(CH_3)_3](Cl^-)_2$,
$[(C_6H_5)_3Sb^+(CH_2)_4N^+(CH_3)_3](OH^-)_2$,
$[(CH_3)_3Bi^+(CH_2)_{18}N^+(CH_3)_3](Br^-)_2$,
$[(C_2H_3)_3N^+(CH_2)_{50}N^+(C_2H_3)_3](OH^-)_2$,
$[(C_6H_5)_3P^+(C_2H_2)_6As^+(CH_3)_3](Cl^-)_2$,
$[(CH_3)_3N^+(CH_2)_6N^+(CH_3)_3](Cl^-)_2$, and

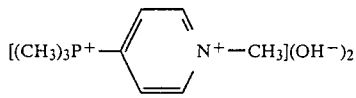

The process of treating the zeolite for use herein is simple and easy to carry out although the results therefrom are dramatic. The process involves compositing the crystalline zeolite material with an alumina support matrix material and, if desired, forming an extrudate of same, impregnating the composite under a vacuum (i.e. a pressure less than atmospheric pressure) with an aqueous solution of an alkali metal fluoride such as an aqueous solution of lithium fluoride, sodium fluoride, potassium fluoride, rubidium fluoride or cesium fluoride with said solution being from about 0.1 to about 2 Normal, said vacuum impregnation being conducted at a temperature of from about 0° C. to about 100° C., preferably from about ambient to about 50° C. The impregnated composite is then contacted with a warm, i.e. ambient to 100° C., preferably 60° C. to 80° C., aqueous solution of from 0.1 to 2 Normal ammonium salt, e.g. 1N NH$_4$NO$_3$, and thereafter calcined at a temperature of from about 200° C. to about 600° C. in an inert atmosphere of air, nitrogen, etc. at subatmospheric, atmospheric or superatmospheric pressures for from about 1 minute to about 48 hours.

The amount of alkali metal fluoride which is utilized is from about 0.05 to about 2 grams of alkali metal fluoride per gram of crystalline zeolite material in the composite, e.g. extrudate.

The ammonium salt solution contacting step may be conducted for a period of time from about 1 hour to about 20 hours. The ammonium salt used is not narrowly critical and will normally be an inorganic salt such as ammonium nitrate, ammonium sulfate, ammonium chloride, etc.

The support matrix material combined with the crystalline zeolite in the initial step of the present method may be in the form of a gel, if desired, and the relative proportion of zeolite component and support matrix material component, on an anhydrous basis, may vary with the zeolite content ranging from about 25 to about 75 weight percent of the dry composite.

Of the high silica zeolite materials advantageously treated in accordance herewith, zeolites ZSM-5, ZSM-11, ZSM-5/ZSM-11 intermediate, ZSM-12, ZSM-23, ZSM-35, ZSM-38 and ZSM-48 are particularly noted. ZSM-5 is described in U.S. Pat. Nos. 3,702,886 and Re. 29,948, the entire contents of each being hereby incorporated by reference herein. ZSM-11 is described in U.S. Pat. No. 3,709,979, the entire teaching of which is incorporated herein by reference. ZSM-5/ZSM-11 intermediate is described in U.S. Pat. No. 4,229,424, the entire contents of which are incorporated herein by reference. ZSM-12 is described in U.S. Pat. No. 3,832,449, the entire contents of which are incorporated herein by reference. ZSM-23 is described in U.S. Pat. No. 4,067,842, the entire teaching of which is incorporated herein by reference. The entire contents of U.S. Pat. Nos. 4,016,245 and 4,046,859, describing ZSM-35 and ZSM-38, respectively, are incorporated herein by reference. ZSM-48 is described in U.S. Pat. No. 4,397,826, the entire teaching of which is incorporated herein by reference.

In general, organic compounds such as, for example, those selected from the group consisting of hydrocarbons, alcohols and ethers, are converted to conversion products such as, for example, aromatics and lower molecular weight hydrocarbons, over the activity enhanced crystalline zeolite prepared as above by contact under organic compound conversion conditions including a temperature of from about 100° C. to about 800° C., a pressure of from about 0.1 atmosphere (bar) to about 200 atmospheres, a weight hourly space velocity of from about 0.08 hr$^{-1}$ to about 2000 hr$^{-1}$ and a hydrogen/feedstock organic compound mole ratio of from 0 (no added hydrogen) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components to product enriched in p-xylene with reaction conditions including a temperature from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In practicing a particularly desired chemical conversion process, it may be useful to incorporate the above-described activity enhanced material with additional matrix comprising another material resistant to the temperature and other conditions employed in the process. Such matrix material is useful as a binder and imparts additional resistance to the catalyst for the severe temperature, pressure and reactant feed stream velocity conditions encountered in many cracking processes.

Useful additional matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families which include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing additional matrix materials, the catalyst employed herein may be composited with an additional porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The additional matrix may be in the form of a cogel. The relative proportions of activity enhanced supported zeolite component and additional matrix, on an anhydrous basis, may vary widely with the zeolite content of the supported zeolite component ranging from about 1 to about 99 percent by weight and more usually in the range of about 5 to about 80 percent by weight of the total dry composite.

The following examples will illustrate the novel method of the present invention.

EXAMPLE 1

Zeolite ZSM-5 prepared from a reaction mixture containing tetraalkylammonium ions and having a silica-to-alumina mole ratio of about 26,000:1 (65 ppm framework alumina, 110 ppm bulk alumina and 0.23 percent sodium) was composited and extruded with Kaiser gamma-alumina ($Al_2O_3$) to provide an extrudate of 65 wt. % ZSM-5 and 35 wt. % $Al_2O_3$. The extrudate product of this example was calcined for 30 minutes at 538° C.

EXAMPLE 2

A sample of the extrudate of Example 1 was vacuum impregnated with saturated aqueous alkali metal fluoride, i.e. sodium fluoride, solution at a temperature of 25° C. After 30 minutes contact, the extrudate was dried at 130° C. and then contacted three times at about 80° C. with warm 1N $NH_4NO_3$ solution (80° C.) The extrudate was hot water washed after each contacting with the warm ammonium salt solution. The extrudate was dried at 130° C. and calcined for 30 minutes at 538° C.

EXAMPLE 3

An sample of each final product of Examples 1 and 2 was subjected to the Alpha Test to measure catalytic activity. The results of this test are listed below:

| Example | Alpha Value |
| --- | --- |
| 1 | less than 0.1 |
| 2 | 70 |

It is observed from the above results that the present method is highly useful for enhancing acid catalytic activity of crystalline zeolites, including those having a silica-to-alumina mole ratio greater than 100, which have, in turn, been composited and extruded with an alumina support matrix, the extrudate being vacuum impregnated with an aqueous solution of an alkali metal fluoride, the impregnated extrude being contacted with an warm aqueous solution of an ammonium salt, and the ammonium salt solution contacted material being calcined.

EXAMPLE 4

A zeolite is prepared from a reaction mixture containing trimethyl [6-(trimethylarsonio)hexyl]ammonium ions. A sample of the zeolite, having a silica-to-alumina mole ratio of greater than about 500, is composited and extruded with alumina as in Example 1 and further treated as in Example 2. The product extrudate of this example exhibits an Alpha value of about 23.

As is known in the art, the Alpha value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1. The Alpha Test is described in U.S. Pat. No. 3,354,078 and in The Journal of Catalysis, Vol. IV, pp. 522-529 (August 1965).

What is claimed is:

1. A process for converting a feedstock comprising an alcohol, ether or mixture thereof to conversion product comprising hydrocarbons which comprises contacting said feedstock at conversion conditions with a catalyst comprising a zeolite composition prepared by a method which comprises the steps of (1) compositing a porous crystalline zeolite having an initial silica-to-alumina mole ratio greater than about 100 with alumina, (2) impregnating the composite under a vacuum with an aqueous solution of an alkali metal fluoride, (3) contacting the impregnated composite with a warm aqueous solution of an ammonium salt, and (4) calcining the ammonium salt solution contacted material at a temperature of from about 200° C. to about 600° C.

2. The process of claim 1 wherein said zeolite has an initial silica-to-alumina mole ratio greater than about 500.

3. The process of claim 1 wherein said ammonium salt solution is ammonium nitrate.

4. The process of claim 1 wherein said zeolite has the structure of ZSM-5, ZSM-11, ZSM-5/ZSM-11 intermediate, ZSM-12, ZSM-23, ZSM-35, ZSM-38 or ZSM-48.

5. The process of claim 4 wherein said zeolite has the structure of ZSM-5 or ZSM-11.

6. A process for converting a feedstock comprising an alcohol, ether or mixture thereof to conversion products comprising hydrocarbons which comprises contacting said feedstock at conversion conditions with a catalyst comprising a composition prepared by a method which comprises the steps of (1) compositing a porous crystalline zeolite having an initial silica-to-alumina mole ratio greater than about 100 with alumina so that the composite comprises from about 25 weight percent to about 75 weight percent zeolite, (2) extruding the composite to form an extrudate thereof, (3) impregnating the extrudate under a vacuum with an aqueous solution of an alkali metal fluoride, (4) contacting the impregnated extrudate with a warm aqueous solution of an ammonium salt, and (5) calcining the ammonium salt solution contacted material at a temperature of from about 200° C. to about 600° C.

7. The process of claim 6 wherein said zeolite has an initial silica-to-alumina mole ratio greater than about 500.

8. The process of claim 6 wherein said ammonium salt solution is ammonium nitrate.

9. The process of claim 6 wherein said zeolite has the structure of ZSM-5, ZSM-11, ZSM-5/ZSM-11 intermediate, ZSM-12, ZSM-23, ZSM-35, ZSM-38 or ZSM-48.

10. The process of claim 9 wherein said zeolite has the structure of ZSM-5 or ZSM-11.

11. The process of claim 1 wherein said alkali metal fluoride is selected from the group consisting of lithium fluoride, sodium fluoride, potassium fluoride, rubidium fluoride and cesium fluoride.

12. The process of claim 6 wherein said alkali metal fluoride is selected from the group consisting of lithium fluoride, sodium fluoride, potassium fluoride, rubidium fluoride and cesium fluoride.

13. The process of claim 1 wherein said conversion conditions include a temperature of from about 100° C. to about 800° C., a pressure of from about 0.1 atmosphere to about 200 atmospheres, a weight hourly space velocity of from about 0.08 $hr^{-1}$ to about 2000 $hr^{-1}$ and a hydrogen/feedstock organic compound mole ratio of from 0 to about 100.

14. The process of claim 1 wherein said conversion conditions include a temperature of from about 275° C. to about 600° C., a pressure of from about 0.5 atmosphere to about 50 atmospheres and a liquid hourly space velocity of from about 0.5 to about 100.

15. The process of claim 6 wherein said conversion conditions include a temperature of from about 100° C. to about 800° C., a pressure of from about 0.1 atmosphere to about 200 atmospheres, a weight hourly space velocity of from about 0.08 hr$^{-1}$ to about 2000 hr$^{-1}$ and a hydrogen/feedstock organic compound mole ratio of from about 0 to about 100.

16. The process of claim 6 wherein said conversion conditions include a temperature of from about 275° C. to about 600° C., a pressure of from about 0.5 atmosphere to about 50 atmospheres and a liquid hourly space velocity of from about 0.5 to about 100.

17. A process for converting a feedstock comprising an alcohol, ether or mixture thereof to conversion product comprising hydrocarbons which comprises contacting said feedstock at conversion conditions with a catalyst comprising a zeolite composition prepared by a method which comprises the steps of (1) compositing a porous crystalline zeolite having an initial silica-to-alumina mole ratio greater than about 100 and the structure of ZSM-5 with alumina, (2) impregnating the composite under a vacuum with an aqueous solution of an alkali metal fluoride, (3) contacting the impregnated composite with a warm aqueous solution of an ammonium salt, and (4) calcining the ammonium salt solution contacted material at a temperature of from about 200° C. to about 600° C.

18. A process for converting a feedstock comprising an alcohol, ether or mixture thereof to conversion product comprising hydrocarbons which comprises contacting said feedstock at conversion conditions with a catalyst comprising a composition prepared by a method which comprises the steps of (1) compositing a porous crystalline zeolite having an initial silica-to-alumina mole ratio greater than 100 and the structure of ZSM-5 with alumina so that the composite comprises from about 25 weight percent to about 75 weight percent zeolite, (2) extruding the composite to form an extrudate thereof, (3) impregnating the extrudate under a vacuum with an aqueous solution of an alkali metal fluoride, (4) contacting the impregnated extrudate with a warm aqueous solution of an ammonium salt, and (5) calcining the ammonium salt solution contacted material at a temperature of from about 200° C. to about 600° C.

* * * * *

UNITED STATES PATENT AND TRADEMARK OFFICE
CERTIFICATE OF CORRECTION

PATENT NO. : 4,538,016

DATED : August 27, 1985

INVENTOR(S) : Joseph N. Miale and Clarence D. Chang

It is certified that error appears in the above-identified patent and that said Letters Patent is hereby corrected as shown below:

Col. 1, line 48, "alikaline" should be --alkaline--.

Col. 2, line 26, "describes" should be --describe--.

Col. 2, line 32, "Therefor" should be --Therefore--.

Col. 5, line 19, "4,067,842" should be --4,076,842--.

Col. 5, line 24, "4,397,826" should be --4,397,827--.

Signed and Sealed this

Nineteenth Day of November 1985

[SEAL]

Attest:

DONALD J. QUIGG

Attesting Officer

Commissioner of Patents and Trademarks